(12) United States Patent
Sakai

(10) Patent No.: US 7,427,451 B2
(45) Date of Patent: Sep. 23, 2008

(54) FUEL CELL SYSTEM

(75) Inventor: Hiromasa Sakai, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 105 days.

(21) Appl. No.: 10/529,040

(22) PCT Filed: Oct. 10, 2003

(86) PCT No.: PCT/JP03/13054

§ 371 (c)(1),
(2), (4) Date: Mar. 24, 2005

(87) PCT Pub. No.: WO2004/036675

PCT Pub. Date: Apr. 29, 2004

(65) Prior Publication Data

US 2006/0083967 A1 Apr. 20, 2006

(30) Foreign Application Priority Data

Oct. 16, 2002 (JP) ............................ 2002-301448

(51) Int. Cl.
*H01M 8/04* (2006.01)
*H01M 8/12* (2006.01)

(52) U.S. Cl. ................. 429/24; 429/13; 429/20; 429/22; 429/26; 429/39

(58) Field of Classification Search .............. 429/13, 429/20, 22, 24, 26, 39
See application file for complete search history.

(56) References Cited

U.S. PATENT DOCUMENTS

| 6,428,919 B1 | 8/2002 | Takahashi et al. |
| 6,432,568 B1 | 8/2002 | Salvador et al. |
| 2001/0021468 A1* | 9/2001 | Kanai et al. ................... 429/12 |
| 2003/0064262 A1* | 4/2003 | Ballantine et al. .............. 429/24 |
| 2003/0162063 A1 | 8/2003 | Yoshizawa et al. |

FOREIGN PATENT DOCUMENTS

| JP | 2000-251915 | 9/2000 |
| JP | 2000-315514 | 11/2000 |
| JP | 2001-256989 | 9/2001 |
| JP | 2004-111102 | 4/2004 |
| KR | 2001-0061248 | 7/2001 |
| WO | WO 03/081704 A2 | 10/2003 |

* cited by examiner

*Primary Examiner*—Patrick Ryan
*Assistant Examiner*—Ben Lewis
(74) *Attorney, Agent, or Firm*—McDermott Will & Emery LLP (57) ABSTRACT

A fuel cell system has a fuel cell (1) performing power generation as a result of reactions in supplied gases, a humidifying device (34) for humidifying at least one supplied gas by using water from water tank (31), and a coolant temperature regulation device (21, 22, 25, 26, 27, 28, 51) for regulating the temperature of the coolant flowing within the fuel cell (1) in order to control the temperature of the fuel cell (1), and a defrosting device (61). The defrosting device (61) melts ice in the water tank (31) during a startup operation of the fuel cell system by applying heat contained in the coolant to the ice. Here, the coolant has an increased temperature as a result of waste heat produced during power generation inside the fuel cell (1).

13 Claims, 7 Drawing Sheets

FUEL CELL SYSTEM

FIELD OF THE INVENTION

This invention relates to a fuel cell system and more particularly, relates to startup control for a fuel cell system.

BACKGROUND OF THE INVENTION

A polymer electrolyte fuel cell comprises a polymer electrolyte membrane displaying proton permeability and a porous catalyst-electrode provided on both sides of the membrane. Air (or oxygen) and hydrogen are respectively supplied to electrodes and power generation is performed as a result of electrochemical reactions between hydrogen and oxygen present in the air.

When protons pass through the polymer membrane, the polymer membrane near to the anode is dried as a result of the migration of protons together with water molecules due to electro-osmosis. This drying process reduces the electrical conductivity of the polymer membrane and therefore has an adverse effect on power generation characteristics. The drying process may be prevented by moisturizing the hydrogen gas and air which are supplied to the electrodes. Tokkai 2001-256989 published by the Japanese Patent Office in 2001 discloses a humidifying device using water (or pure water) from a water tank in order to humidify supplied gases such as hydrogen and air. A polymer electrolyte fuel cell employing an external humidifying system is provided with a humidifying device for humidifying gases supplied to the fuel cell on an external section of the fuel cell. However when the fuel cell system is disposed in an external environment at a temperature of less than 0° C., it is not possible to humidify supplied gases such as hydrogen or air due to the fact that the water in the water tank freezes. Consequently, the fuel cell can only be started up after melting ice in the water tank. A prior art technique prevents freezing of water by using an electrical heater to heat the water tank or the humidifying device when the external temperature is less than 0° C.

SUMMARY OF THE INVENTION

However the technique above increases the load on the battery due to the extremely large amount of power used by the electrical heater in order to prevent freezing of water.

A fuel cell system sometimes comprises a temperature regulation device which regulates the temperature of a coolant flowing through the fuel cell so that the fuel cell is maintained to a suitable temperature. The temperature of the coolant in the fuel cell is increased using waste heat resulting from power generation in the fuel cell.

It is therefore an object of this invention to obtain a temperature increase at startup of the fuel cell system so as to melt ice in the water tank without extra fuel consumption or power consumption.

In order to achieve the above object, this invention provides a fuel cell system having: a fuel cell generating power as a result of chemical reactions between supplied gases, wherein a coolant flows in the fuel cell and undergoes a temperature increase as a result of absorbing waste heat produced by power generation in the fuel cell; a water tank; a humidifying device for humidifying at least one supplied gas by using water from the water tank; and a coolant temperature regulation device for regulating a temperature of the coolant flowing inside the fuel cell so as to control the temperature of the fuel cell.

The fuel cell system comprises a defrosting device for melting ice in the water tank by applying heat of the coolant to the water tank; a coolant recirculation passage for allowing a recirculation of the coolant through the defrosting device and the fuel cell; a flow generator for generating a flow of the coolant from the fuel cell to the defrosting device; and a controller for controlling a startup operation of the fuel cell system. The controller has the function of controlling the flow generator to generate a flow of coolant from the fuel cell to the defrosting device so as to melt ice in the water tank while the startup operation of the fuel cell system. The coolant has the function of absorbing waste heat resulting from power generation operations and melting ice in the water tank.

Further, this invention provides a control method for controlling a fuel cell system, the fuel cell system having: a fuel cell generating power as a result of chemical reactions between supplied gases, wherein a coolant flows in the fuel cell and undergoes a temperature increase as a result of absorbing waste heat produced by power generation in the fuel cell; a water tank; a humidifying device for humidifying at least one supplied gas by using water from the water tank; and a coolant temperature regulation device for regulating a temperature of the coolant flowing inside the fuel cell so as to control the temperature of the fuel cell.

The control method comprises the steps of providing a defrosting device for melting ice in the water tank by applying heat of the coolant to the water tank; providing a coolant recirculation passage for allowing a recirculation of the coolant through the defrosting device and the fuel cell; and generating a flow of coolant from the fuel cell to the defrosting device so as to melt ice in the water tank while a startup operation of the fuel cell system.

The details as well as other features and advantages of this invention are set forth in the remainder of the specification and are shown in the accompanying drawings.

DESCRIPTION OF THE PREFERRED EMBODIMENTS

Although fuel cell systems shown in the embodiments below are adapted for use with a vehicle, the fuel cell systems may be suitably modified in order to allow use in an electrical appliance.

Figure 1:
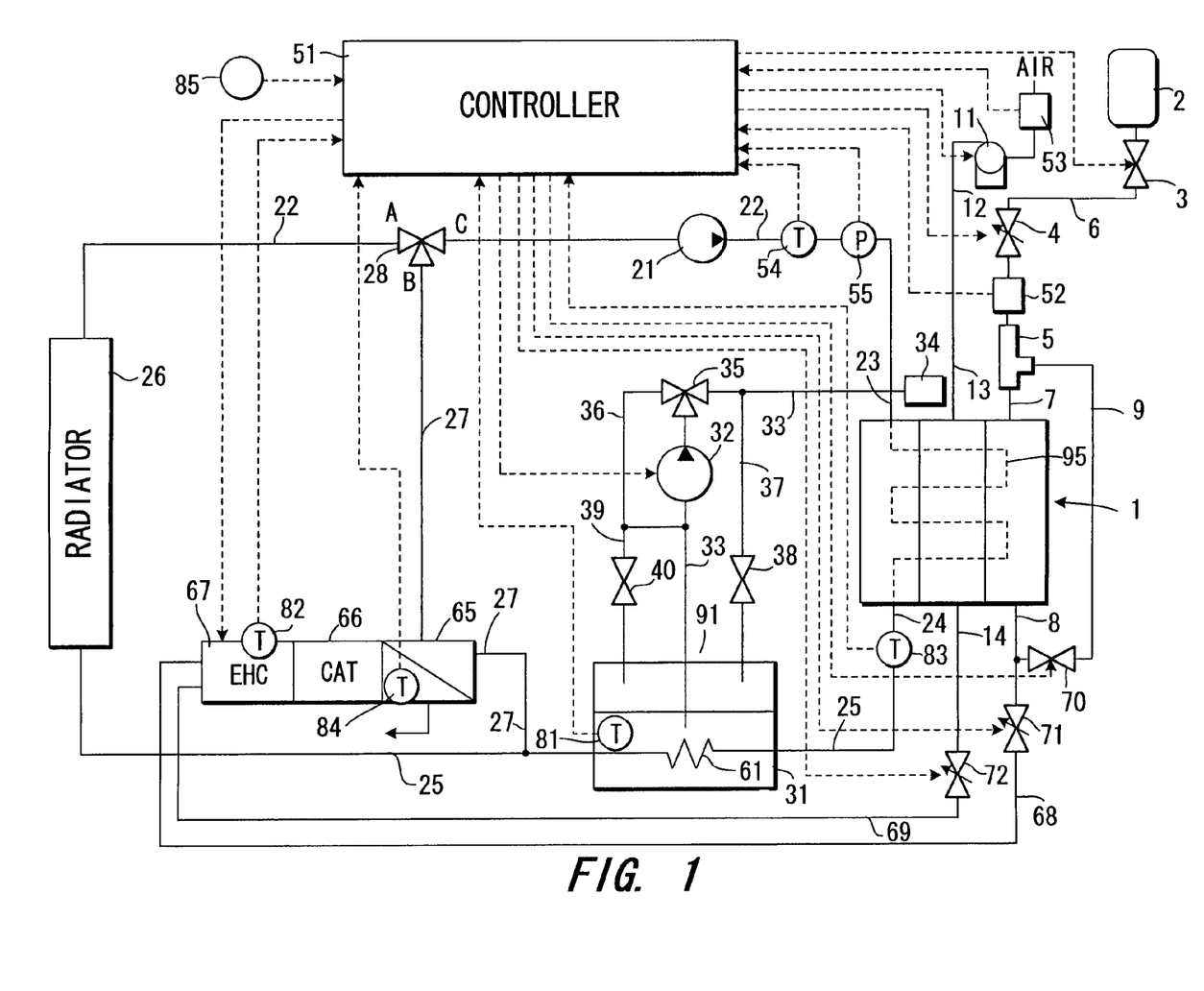
FIG. 1 is a schematic diagram of a fuel cell system according to a first embodiment of this invention.

Referring to FIG. 1 of the drawings, a fuel cell system as defined by a first embodiment of the invention will be described.

The fuel cell system comprises a fuel cell 1 provided with an air passage, a hydrogen passage and a coolant passage 95, and a humidifying device 34 disposed on an external section of the fuel cell 1. The fuel cell 1 is a polymer electrolyte fuel cell. In a usual case, hydrogen gas and air supplied to the fuel cell 1 are humidified using water resulting from chemical reactions extracted by a porous separator in the fuel cell 1. Hereafter supplied air and hydrogen gas are sometimes simply referred to as supplied gas. On the other hand, when the temperature in the fuel cell 1 increases as a result of an increase in the load on the fuel cell 1 and thus a suitable humidity level can not be maintained by only humidifying the inside of the fuel cell 1 (for example, in the temperature region greater than or equal to a fixed value T3 in FIG. 5), the humidifying device 34 performs auxiliary humidifying operations on the air and hydrogen gas using water from a water tank 31. The humidified air and hydrogen gas is supplied to each electrode in the fuel cell 1.

The hydrogen is supplied from a hydrogen tank 2 to an injector 5 through a hydrogen supply passage 6. The hydrogen is introduced from the injector 5 into a hydrogen passage inlet 7 of the fuel cell 1. A hydrogen passage outlet 8 of the fuel cell 1 is connected to the injector 5 through a hydrogen recirculation passage 9. When a cut-off valve 3 is in the open position, hydrogen returns from the hydrogen passage outlet 8 to the injector 5 through a cut-off valve 70. The cut-off valve 3 is normally in the closed position. Air is pressurized by a compressor 11 and is supplied to an air passage inlet 13 of the fuel cell 1 through an air supply passage 12.

Water in the water tank 31 is transferred under pressure to the injector 34 (humidifying device) through a water supply passage 33 from a water supply pump 32. Water is injected into the hydrogen supply passage 6 and the air supply passage 12 from the water injector 34. This operation allows the hydrogen gas and the air introduced into the fuel cell 1 to be humidified.

A pressure regulator valve 35 is provided in the water supply passage 33 in order to maintain the water supply pressure to a fixed value. A first return passage 36 extending from the pressure regulation valve 35 is connected to the upstream side of the water supply pump 32 on the water supply passage 33. A cut-off valve 38 which is normally in the closed position is provided in a second return passage 37 which branches from the water supply passage 33 downstream of the water pump 32 and returns water to the water tank 31. A cut-off valve 40 which is normally in the closed position is provided in a third return passage 39 which branches from the first return passage 36 of the pressure regulator valve 35 and returns water to the water tank 31. When the cut-off valves 38, 40 are both opened, water is drained to the water tank 31 through the return passage 37, 39.

After high levels of power generation by the fuel cell 1 are enabled, a controller 51 regulates a hydrogen flow amount flowing in the hydrogen supply passage 6 in response to the required power generation amount by controlling a pressure control valve 4 provided in the hydrogen supply passage 6. Even when for example the required power generation amount is varied, the controller 51 controls the air flow amount from the compressor 11 in order to obtain an optimal ratio (fixed value) between the flow amounts of air and hydrogen in response to signals from a flow amount sensor 52 for detecting a hydrogen flow amount and a flow amount sensor 53 for detecting an air flow amount in the air supply passage 12.

The controller 15 comprises a microcomputer having a central processing unit (CPU) for running programs, read-only memory (ROM) for storing programs and data, random access memory (RAM) for temporarily storing data acquired as computing results from the CPU, and an input/output interface (I/O interface).

The fuel cell system comprises a flow generator for generating a flow of coolant. The flow generator comprises a coolant pump 21 which is disposed in a coolant recirculation passage and transfers coolant under pressure. The fuel cell system comprises a coolant temperature regulation device which regulates the temperature of the coolant flowing inside the fuel cell 1 so that when high levels of power generation are enabled in the fuel cell 1, the temperature in the fuel cell 1 is substantially fixed. The coolant temperature regulation device comprises a coolant recirculation passage for recirculating coolant inside the fuel cell 1 and in a radiator 26, a first bypass passage 27 branching from the coolant recirculation passage and bypassing the radiator 26, and a three-way valve (passage switching device) for switching the passage for the coolant from a passage passing through the radiator 26 to a passage passing through the first bypass passage 27. The controller 51 uses the three-way valve 28 in order to selectively switch the two passages in order to control the coolant temperature in the fuel cell.

The radiator 26 performs heat exchange using outside air entering while the vehicle is running. A pair of coolant passages 22, 25 connect a coolant passage 95 in the fuel cell and the radiator 26. Thus, the coolant recirculation passage is provided with a radiator 26, a coolant passage 95 inside the fuel cell 1, a coolant passage 22 and a coolant passage 25. Coolant flowing in the coolant recirculation passage flows from the outlet of the coolant pump 21 to the coolant passage 22, the coolant passage 95 in the fuel cell 1, the coolant passage 25 and the radiator 26. Thereafter the coolant returns to the inlet of the coolant pump 21.

The first bypass passage 27 bypassing the radiator 26 branches from the coolant passage 25 downstream of the fuel cell 1. The first bypass passage 27 is connected with the coolant passage 22 through the three-way valve 28 (passage switching device).

When no current is applied, the three-way valve 28 connects the port A with the port C and isolates the port B from the port C. When current is applied, the three-way valve 28 cuts off the connection between the port A and the port C and connects the port B with the port C. Here the current serves as a command signal. The passage for coolant is switched from a passage passing through the radiator 26 to a passage passing through the first bypass passage 27 as a result of activation or non-activation of the three-way valve 28.

After high levels of power generation in the fuel cell 1 are enabled, the controller 51 controls the three-way valve 28 so that the temperature of coolant in the fuel cell 1 coincides with a reference temperature (substantially fixed temperature). In other words, the controller 51 applies or does not apply a current to the three-way valve 28 and thus commands the three-way valve 28 to selectively switch the flow of coolant through the radiator 26 when the coolant temperature is higher than the reference temperature and through the first bypass temperature 27 when the coolant temperature is lower than the reference temperature. The reference temperature is determined in advance depending on the state of the fuel cell. Additionally the controller 51 controls the coolant flow amount injected by the coolant pump 21 in response to a signal from a temperature sensor 83 for detecting a coolant temperature in the coolant passage outlet 24, a pressure sensor 55 for detecting a coolant pressure and a temperature sensor 54 for detecting coolant in the coolant passage inlet 23. The temperature sensor 83 detects a coolant temperature in the coolant passage outlet 24 as a measure of the temperature of the fuel cell 1. However instead of the coolant temperature in the coolant passage outlet 24, the temperature sensor 83 may detect directly the temperature of the fuel cell 1.

The electrical power generated by the fuel cell 1 is supplied to electrical apparatuses such as a battery or an electrical drive motor. When the vehicle mounting the fuel cell system is parked and left in an external temperature of less than or equal to 0° C., water in the water tank 31 freezes and supplied hydrogen gas and air can not be humidified. Consequently in this embodiment, a defrosting device or a heater is provided in order to melt ice in the water tank 31 using heat from the coolant which has an increased temperature using waste heat produced by power generation within the fuel cell 1.

The water tank 31 is disposed downstream of the fuel cell 1 relative to the flow of coolant. A section of the coolant passage 25 which is connected to the coolant passage outlet 24 of the fuel cell 1 is provided in the water in the water tank 31. The section of the coolant passage in the water tank 31 is formed in the shape of a coil for example and serves as a heat exchanging section 61 (heat exchanger) allowing heat exchange between the coolant and the water in the water tank 31. In other words, the heat exchange section 61 is the defrosting device.

A heat exchanger 65 is provided along the first bypass passage 27 and performs heat exchange operations between the coolant in the first bypass passage 27 and combustion gas. The heat exchanger 65 is integrated with an electrically heated catalyst 67 (EHC) and a catalytic combustor 66. A hydrogen passage 68 branching from the hydrogen recirculation passage 9 is connected to the electrically heated catalyst 67. The other end of the discharge air passage 69, one end of which is connected to the air passage outlet 14 of the fuel cell 1, is also connected to the electrically heated catalyst 67. A normally-closed cut-off valve 70 is provided in the hydrogen recirculation passage 9. A normally-closed flow control valve 71 is provided in the branching hydrogen passage 68. A pressure control valve 72 is provided in the discharge air passage 69.

The cut-off valve 3 and the pressure control valve 4 in the hydrogen supply passage 6 are opened, the cut-off valve 70 in the hydrogen recirculation passage 9 is closed and the flow control valve 71 in the branching hydrogen passage 68 is opened to supply hydrogen. In this situation, hydrogen in the hydrogen tank 2 is supplied to the catalytic combustor 66 through the hydrogen supply passage 6, the hydrogen passage in the fuel cell 1 and a branching hydrogen passage 68. When the compressor 11 is placed in the ON position and the pressure control valve 72 in the discharge air passage 69 is opened, air injected from the compressor 11 is supplied to the catalytic combustor 66 through the air supply passage 12, the air passage in the fuel cell 1 and the discharge air passage 69. Hydrogen and oxygen present in the air are combusted in the catalytic combustor 66. Combustion gas flows into the heat exchanger 65 and heats coolant by heat exchange. Thereafter the combustion gas is discharged to the outside atmosphere.

Since hydrogen is not reacted (combusted) with oxygen in the air until the catalyst in the catalytic combustor 66 reaches an activation temperature, the electrically heated catalyst 67 increases the temperature of the hydrogen gas and the air to a temperature enabling ignition in the catalytic combustor 66.

Figure 2:
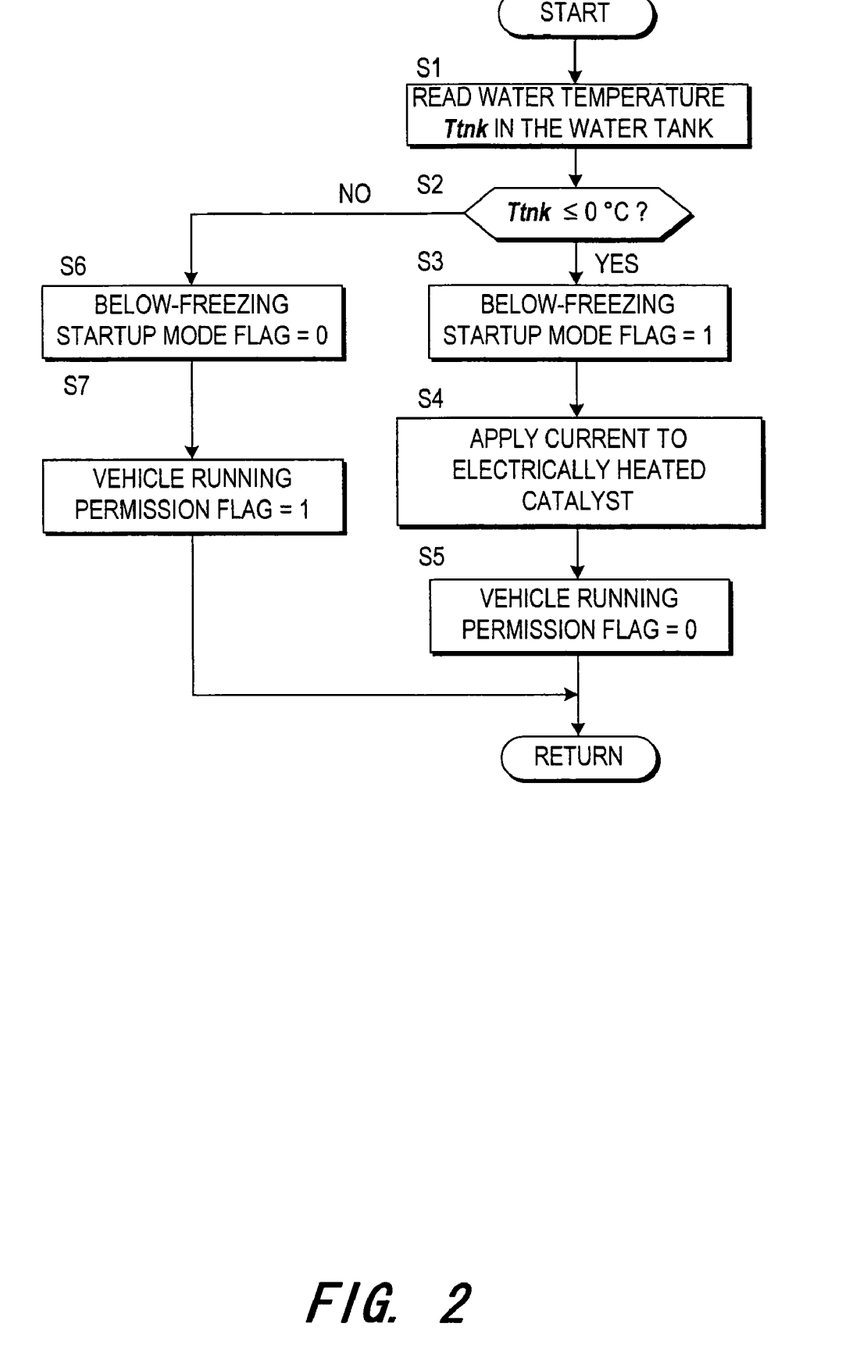
FIG. 2 is a flowchart of a setting routine for a below-freezing startup mode flag as defined by the first embodiment.
Figure 3:
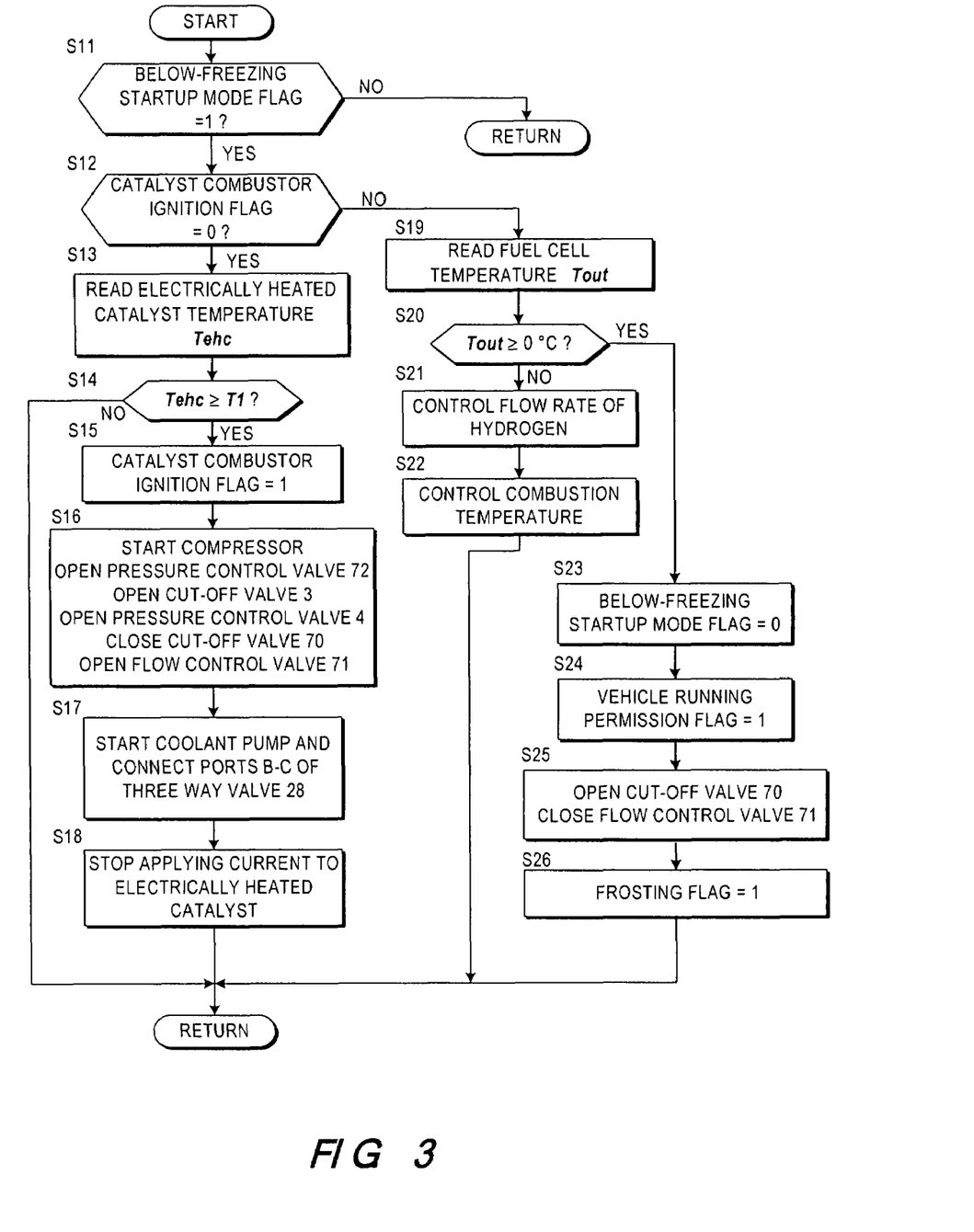
FIG. 3 is a flowchart showing a first startup control routine according to the first embodiment.
Figure 4:
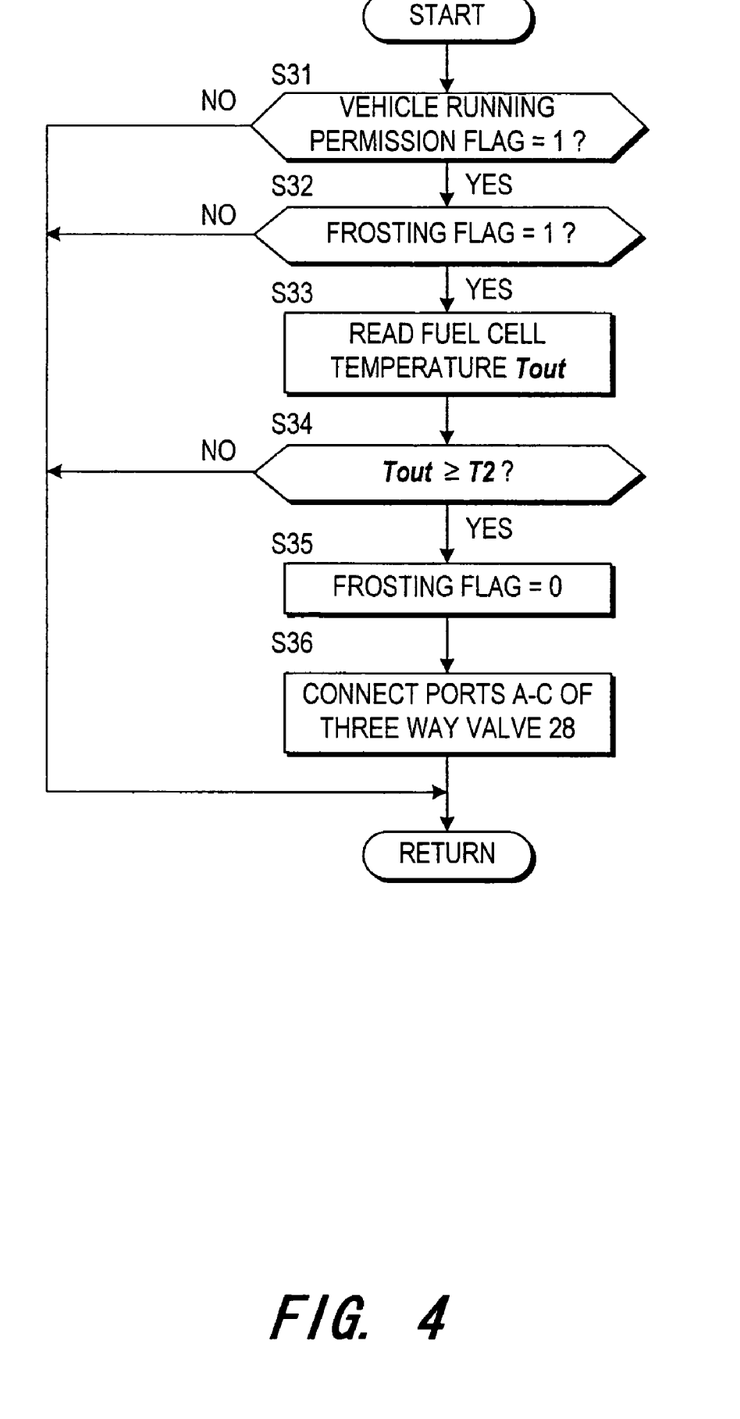
FIG. 4 is a flowchart showing a second startup control routine according to the first embodiment.

Next the flowcharts in FIGS. 2-4 showing startup control of the fuel cell system executed by the controller 51 will be described.

Referring to the flowchart in FIG. 2, a control routine for setting the below-freezing startup mode flag will be described. This control routine is executed only once when a signal from a switch 85 is switched from the OFF position to the ON position (in other words, when startup operations are commenced). The switch 85 may comprise a key switch normally provided in a vehicle. When the switch 85 is switched from OFF to ON to startup the vehicle, the fuel cell system is started.

Firstly in a step S1, the water temperature Ttnk [° C.] in the water tank 31 is read via the temperature sensor 81. In a step S2, the water temperature Ttnk [° C.] in the water tank 31 is compared with freezing point, 0° C. When the water temperature Ttnk [° C.] in the water tank 31 is less than or equal to 0° C., it is determined that water in the water tank 31 has frozen and the routine proceeds to a step S3. In the step S3, the below-freezing startup mode flag is set to a value of unity (below-freezing startup mode flag=1). The below-freezing startup mode flag shows whether the fuel cell system is started at a temperature below or above freezing point. Thereafter the routine proceeds to a step S4 and a current is applied to the electrically heated catalyst 67. As a result, the temperature of the electrically heated catalyst 67 is increased.

At this stage, since it is not possible for the fuel cell 1 to perform high level power generation, the vehicle can not be operated. Thus in a step S5, the running permission flag is set to zero (running permission flag=0). The running permission flag is a flag which shows whether or not the running of the vehicle is prohibited. When the running permission flag is set to zero, a lamp near the driver's seat showing that vehicle running is prohibited is illuminated.

When the water temperature Ttnk in the water tank 31 exceeds freezing point 0° C., it is determined that the water in the water tank 31 is not frozen. In this situation, the supplied gas can be immediately humidified and the system shifts to normal mode. Consequently high levels of power generation by the fuel cell 1 are enabled immediately. When the routine proceeds from the step S2 to the steps S6, S7, the below-freezing startup mode flag is set to a value of zero (below-freezing startup mode flag=0), and the running permission flag is set to unity (running permission flag=1). When the running permission flag is set to unity, a lamp near to the driver's seat showing that vehicle running is prohibited is turned off.

Referring to the flowchart in FIG. 3, a first startup control below freezing point will be described. The control routine in FIG. 3 is executed at a fixed interval (for example 10 msec).

In FIG. 3, in a step S11, the value of the below-freezing startup mode flag is read and it is determined whether the below-freezing startup mode flag is unity or not. When the below-freezing startup mode flag=0, it is not necessary to perform startup control below freezing point. Thus the routine is terminated at that point.

When the below-freezing startup mode flag=1, the routine proceeds to a step S12 where a catalytic combustor ignition flag is read and it is determined whether the below-freezing startup mode flag is zero or not. The catalytic combustor ignition flag is a flag showing whether or not it is possible to combust air and hydrogen in the catalytic combustor 66. When the catalytic combustor ignition flag=1, it is possible to combust air and hydrogen in the catalytic combustor 66. The catalytic combustor ignition flag is set to an initial value of zero when the fuel cell system is started. When the catalytic combustor ignition flag has a value of zero (catalytic combustor ignition flag=0), the routine proceeds to a step S13 and the temperature Tehc [° C.] in the electrically heated catalyst 67 is read via the temperature sensor 82. In a step S14, the temperature Tehc [° C.] of the electrically heated catalyst 67 is compared with a predetermined temperature T1 [° C.]. The predetermined temperature T1 is the minimum temperature (for example, 70-80° C.) at which ignition of the gas comprising air and hydrogen is possible in the catalytic combustor 66.

If the temperature Tehc of the electrically heated catalyst 67 is less than a predetermined temperature T1, the routine is terminated. At this time, a current is applied to the electrically heated catalyst 67 and the temperature Tehc of the electrically heated catalyst 67 increases.

When the temperature Tehc of the electrically heated catalyst 67 is greater than or equal to the predetermined temperature T1, the routine proceeds from the step S14 to a step S15 and the catalytic combustor ignition flag is set to unity (catalytic combustor ignition flag=1). At this time, hydrogen and air flows into the catalytic combustor 66 and is combusted. In a step S16, the compressor 11 is switched to the ON position in order to supply air to the catalytic combustor 66 and the pressure control valve 72 is opened. The cut-off valve 3 and the pressure control valve 4 are opened in order to supply hydrogen gas to the catalytic combustor 66, the cut-off valve 70 is closed and the flow control valve 71 is opened.

In this manner, the air discharged from the compressor 11 passes through the fuel cell 1 and the pressure control valve 72 and is supplied to the electrically heated catalyst 67. Hydrogen flows through the cut-off valve 3, the pressure control valve 4, the fuel cell 1, the flow control valve 71 and is supplied to the electrically heated catalyst 67. After being heated by the electrically heated catalyst 67, hydrogen gas and air is introduced into the catalytic combustor 66 and hydrogen is combusted using oxygen in the air by the catalyst which has reached an activation temperature. The resulting combustion gas is introduced into a heat exchanger 65 and discharges heat due to heat exchange with the coolant. Thereafter the combustion gas at reduced temperature is discharged to the atmosphere. Since the cut-off valve 70 is closed, hydrogen in the hydrogen recirculation passage 9 of the injector 5 is not recycled.

In the step S17, the coolant which has been heated by combustion gas in the heat exchanger 65 is transferred to the fuel cell 1 through a first bypass passage 27 by switching on the coolant pump 21. The controller 21 applies a current to the three-way valve 28 so that the port A is cut off from the port C and the port B is connected to the port C. In this manner, coolant heated in the heat exchanger 65 flows into the inner section of the fuel cell 1 through the fuel cell inlet 23 via the coolant passage 22 from the first bypass passage 27. Thereafter coolant which has a lower temperature due to heat loss in the fuel cell 1 flows through the coolant passage 25 from the fuel cell outlet 24 and returns to the heat exchanger 65 of the first bypass passage 27. In a step S18, since combustion in the catalytic combustor 66 has already commenced, the application of current to the electrically heated catalyst 67 is stopped and power consumption by the battery is stopped.

Since the catalytic combustor ignition flag=1, when the control routine is performed on the immediately subsequent occasion, the routine proceeds from the step S12 to the step S19 and the coolant temperature Tout [° C.] in the fuel cell outlet 24 is read as a measure of the temperature of the fuel cell 1 via the temperature sensor 83. In a step S20, the coolant temperature Tout [° C.] in the fuel cell outlet 24 is compared with freezing point, 0° C.

If the coolant temperature Tout [° C.] in the fuel cell outlet 24 is less than freezing point 0° C., the routine proceeds to a step S21. In the step S21, the hydrogen flow amount flowing through the flow control valve 71 is controlled so that actual hydrogen flow amount detected by the flow amount sensor 52 coincides with the reference hydrogen flow amount. The reference hydrogen flow amount is determined in advance so that heat generation is performed efficiently in the catalytic combustor 66. In this manner, the heat release amount of the catalytic combustor becomes a fixed value for example (refer to the solid line in FIG. 5A).

Figure 5A:
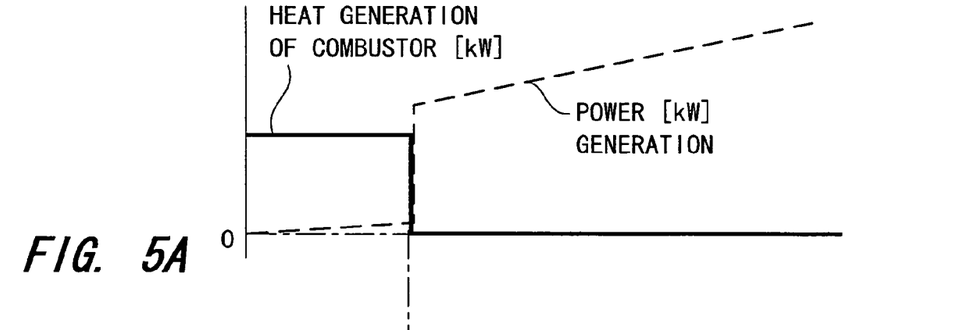
FIG. 5A is a graph showing temporal variation of heat generation in a combustor and power generation of a fuel cell according to the first embodiment.
Figure 5B:
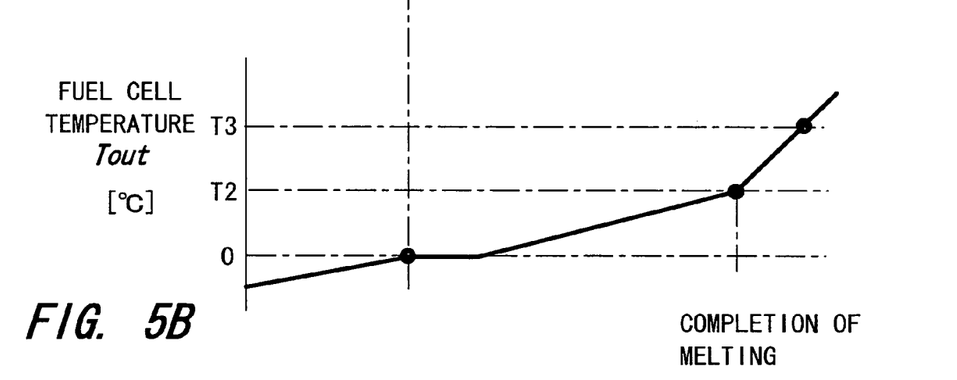
FIG. 5B is a graph showing the temperature of the fuel cell according to the first embodiment.
Figure 5C:
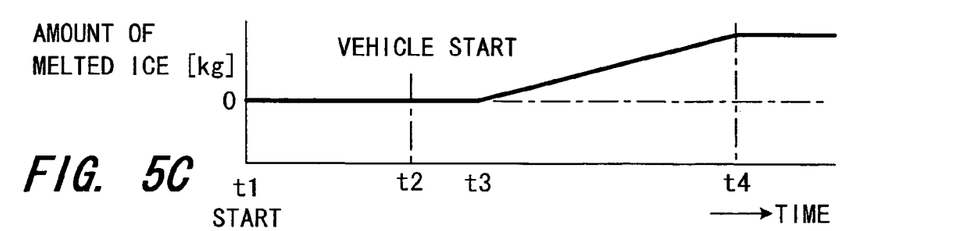
FIG. 5C is a graph showing the amount of melted ice in a water tank according to the first embodiment.

FIG. 5 is a schematic diagram of variation over time of the catalytic combustor heat release value after the fuel cell 1 is started at a timing t1 when water in the water tank 1 is below freezing point (the solid line in FIG. 5A), of the power generation amount in the fuel cell 1 (the broken line in FIG. 5A), of the coolant temperature at the fuel cell outlet (FIG. 5B) and of the ice melt amount (FIG. 5C).

In a step S22, the compressor 11 and the pressure control valve 72 are controlled in order to regulate the pressure and the flow amount of the air discharged from the compressor 11 so that the actual combustion temperature detected by the temperature sensor 84 coincides with a reference temperature. When the actual combustion temperature is lower than the reference temperature, the air-fuel ratio (the ratio of the hydrogen flow amount and the air flow amount) is controlled to be rich by the decrease in the air flow amount introduced to the catalytic combustor 66. In this manner, the combustion temperature increases. Conversely when the actual combustion temperature is higher than the reference temperature, the air-fuel ratio is controlled to be lean by the increase in the air flow amount. In this manner, the combustion temperature decreases.

The coolant pump 21 is operated and the heat generated by the catalytic combustor 66 is applied to the coolant by the heat exchanger 65 which results in a temperature increase in the coolant. The coolant which has undergone a temperature increase passes through the three-way valve 28 from the first bypass passage 27 and flows into fuel cell 1. The heat generated in the catalytic combustor 66 is transferred to the fuel cell 1 through the recirculation of the coolant and allows the temperature of the fuel cell 1 to increase. The fuel cell 1 normally has the coolant passage 95 arranged such that the fuel cell 1 performs extremely efficient heat exchange operations with the coolant flowing through the coolant passage 95 in the fuel cell 1. Thus the temperature of the coolant at the coolant outlet 24 of the fuel cell 1 falls to a temperature which is substantially equal to the temperature of the fuel cell 1. Thus although the fuel cell 1 undergoes a temperature increase due to the absorbed heat, the temperature of the coolant at the fuel cell outlet 24 is substantially equal to the temperature of the fuel cell 1. Thus if the fuel cell 1 is to be greater than or equal to 0° C., the coolant temperature at the fuel cell outlet 24 must also be greater than or equal to freezing point 0° C. Even when high levels of power generation are performed if the fuel cell 1 is below freezing point (for example—20° C.), water produced as a result of power generation is cooled and refreezes in the fuel cell 1 which is below freezing point. If the fuel cell 1 is not heated to a temperature at which water does not refreeze, high levels of power generation in the fuel cell 1 are not possible. Thus high levels of power generation are only possible and the running permission flag allowing vehicle running is set to unity after the coolant temperature of the fuel cell outlet 24 exceeds freezing point 0° C. (after the time t2 in FIG. 5).

When coolant at a temperature of less than 0° C. flows into the water tank 31 which is downstream of the fuel cell 1, heat is applied to the ice gradually by the heat exchanger 61 in the water tank 31. However this does not result in melting of ice. The freezing point of the coolant (for example −20° C.) is much lower than 0° C. and it can flow at a temperature less than 0° C. Thus as shown in FIG. 5C, the melted amount of ice, in other words, the heat used to melt ice is substantially zero, in this stage. In the heat exchanger 61 in the water tank 1, the coolant does not lose much heat due to a lack of heat of fusion applied to ice. In this manner, it is possible to apply heat produced in the catalytic combustor 66 efficiently only to the fuel cell 1. Thus the heat can be applied to the fuel cell 1 which is at a temperature in the vicinity of 0° C. With respect to the same hydrogen consumption amount, it is possible to rapidly reach high levels of power generation by the fuel cell 1 and a state enabling vehicle running.

In this manner, when the coolant temperature Tout at the fuel cell outlet 24 is greater than or equal to 0° C., it is determined that the fuel cell 1 is in a condition enabling high levels of power generation. Thus the routine proceeds from the step S20 to the step S23 and S24. As a result, below-freezing startup mode is terminated and vehicle running is permitted. In a step S23 the below-freezing startup mode flag is set to zero and in a step S24 the running permission flag is set to unity. When the running permission flag has a value of unity, a lamp near to the driver's seat showing that vehicle running is prohibited is turned off.

When the driver operates the vehicle after the lamp is turned off, the fuel cell 1 generates the electrical power required for vehicle operation. Therefore, in a step S25, the cut-off valve 70 is opened, the flow control valve 71 is closed, hydrogen supply to the catalytic combustor 66 is terminated and hydrogen is recirculated to the hydrogen recirculation passage 9. In other words, the controller 51 stops the operation of the heat exchanger 65 (heater) by stopping supply of hydrogen to the catalytic combustor 66. This is due to the fact that it is possible to heat the coolant flowing into the fuel cell 1 using the power generated in the fuel cell 1. In this manner, combustion in the catalytic combustor 66 is finished and the combustor heat release value becomes zero (the solid line in FIG. 5A).

However at this time (the time t2 in FIG. 5), ice in the water tank 1 is not melted. As a result, in the step S26, the defrosting flag (initial value of zero at the beginning of the startup operation of the fuel cell system) is set to unity (defrosting flag=1). The defrosting flag is a flag showing whether or not melting of ice is currently performed in the water tank 31. When it is assumed that the vehicle is operated immediately after the lamp showing that vehicle running is prohibited is turned off, the power generation amount in the fuel cell 1 increases after the time t2 as shown by the broken line in FIG. 5A.

When the vehicle is running, the temperature of the fuel cell 1 increases as a result of power generation in the fuel cell 1, and coolant flowing in the fuel cell 1 is heated by heat (waste heat) produced by the fuel cell 1. As a result, as shown by the solid line in FIG. 5B, the coolant temperature Tout of the fuel cell outlet 24 increases to a temperature which is higher than 0° C. Heat (corresponding to heat of fusion) is applied to ice by the heat exchanger 61 in the water tank 31 as a result of the circulation of coolant which is at a temperature higher than 0° C. As a result, ice is melted. The melted amount of ice which is zero at a time t2 as shown in FIG. 5C increases as a function of time. At a time t4, melting of all of the ice in the water tank 31 is finished and the amount of ice melted after the time t4 becomes fixed. After the time t4, the coolant temperature at the fuel cell outlet 24 increases more rapidly than before the time t4.

In this manner, in this embodiment, firstly the fuel cell 1 is heated to greater than or equal to a value of 0° C. using coolant which has a high temperature as a result of heat exchange in the heat exchanger 65. Melting of ice in the water tank is performed using the coolant applied heat (waste heat) produced during power generation in the fuel cell. After melting of all the ice in the water tank 31 is finished, the fuel cell system shifts to normal operation mode.

FIG. 4 describes a second startup control below freezing point. The control routine in FIG. 4 is executed at a fixed period (for example, 10 msec).

In a step S31 in FIG. 4, the running permission flag is read to determine whether or not the running permission flag is unity, and in a step S32 the defrosting flag is read to determine whether or not the defrosting flag is unity. When the running permission flag=1 and the defrosting flag=1, the routine proceeds to the step S33 where a coolant temperature Tout [° C.] at the fuel cell outlet is read via the temperature sensor 83. In the step S34, the coolant temperature Tout [° C.] at the fuel cell outlet is compared with a second predetermined temperature T2 [° C.].

The second predetermined temperature T2 is the temperature when melting of all the ice in the water tank 31 should be finished. The second predetermined temperature T2 depends on the power generation amount in the fuel cell 1. The ROM of the controller 51 may store a table of predetermined temperatures T2 corresponding to a power generation amount in the fuel cell 1. Thus the controller 51 may look up a table in order to calculate a predetermined temperature T2 from an actually detected power generation amount of the fuel cell. Put simply, a predetermined temperature T2 may be a constant. In a step S34, other than the temperature comparison, it may be determined whether or not the melting of all the ice in the water tank 31 is finished based on the power generation amount of the fuel cell 1.

When the coolant temperature Tout of the fuel cell outlet is less than the fixed temperature T2, since melting of all ice in the water tank 31 is not finished, the routine is terminated. When the coolant temperature Tout of the fuel cell outlet 24 is greater than or equal to the predetermined temperature T2 (the time t4 in FIG. 5), it is determined that melting of all of the ice in the water tank 31 is finished and the routine proceeds to a step S35. In the step S35, the defrosting flag is set to a value of zero (defrosting flag=0). Thereafter in a step S36, application of current to the three-way valve 28 is stopped, the port B and the port C are cut off and the port A and the port C are connected. In this manner, the fuel cell system shifts to normal mode and coolant flows through the radiator 26.

The effect of this embodiment will be described hereafter.

(a) Since water freezing in the water tank 31 is melted using heat (waste heat) in the fuel cell 1 produced as a result of power generation, it is possible to prevent excess consumption of hydrogen gas in the fuel cell 1 or excess use of power. In this manner, fuel consumption in the fuel cell system can be reduced. Most of the heat produced below freezing point by power generation can be used to increase the temperature of the fuel cell 1. Thus it is possible to shorten the time (the startup time of the fuel cell) until high levels of power generation are enabled.

(b) Since the heat exchanger 61 in the water tank 31 is disposed downstream of the fuel cell 1, heat in the coolant heated in the heat exchanger 65 is transmitted to the fuel cell upstream of the water tank 31 and the temperature increase of the fuel cell 1 can be optimized. After undergoing heat exchange in the fuel cell 1, the coolant flows to the heat exchanger 61 in the water tank 31. In this case, since the temperature of the coolant leaving the fuel cell 1 is lower than the temperature of the main section of the fuel cell 1, it is possible to prevent the temperature of the coolant leaving the fuel cell 1 from exceeding 0° C. until the temperature of the main body of the fuel cell 1 is greater than or equal to 0° C. In this manner, the energy required until high levels of power generation start in the fuel cell 1 is not high and the fuel cell 1 can be started rapidly.

(c) During high load operations when the external temperature is high, the fuel cell 1 of course has a high temperature. The first bypass passage 27 (normally narrow) is adapted so that coolant does not flow under these conditions. A large amount of coolant flows into the coolant recirculation passage (22, 25) and the temperature of the fuel cell 1 is reduced. If a heat exchanger 65 was provided in the coolant recirculation passage (22, 25) as a heater, it would be necessary to increase the capacity of the coolant pump 21 due to pressure loss. However in this embodiment, since the heat exchanger 65 is provided in the first bypass passage 27 to act as a heater instead of being provided in the coolant recirculation passage (22, 25), it is possible to avoid an increase in the pressure loss of the coolant recirculation passage (22, 25).

(d) The water tank 31 is positioned on the coolant passage 25 upstream of the branching position of the first bypass passage 27 from the coolant passage 25. As a result, water in the water tank 31 can be maintained at a high temperature by the coolant warmed by the fuel cell 1 not only while the fuel cell 1 is warmed up but even when the fuel cell 1 is operated at a high temperature when cooling the fuel cell 1 is necessary. In this manner, less heat is required to evaporate water used for humidifying operations. In particular, when the water tank 31 is insulated, the effect is increased.

(e) When the temperature of the fuel cell 1 is less than 0° C., the water in the water tank 31 does not exceed 0° C. As a result, when the heat exchanger 65 is operated as a heater in a region in which the temperature detected value of the fuel cell is less than 0° C., a large amount of heat from the heat exchanger 65 is not used as heat of fusion to melt ice. The heat energy of the heat exchanger 65 is used to increase the temperature of the ice in the water tank 31 to 0° C. In this manner, it is possible to melt ice in the water tank 31 using only waste heat from the fuel cell 1. Therefore it is possible to suppress hydrogen gas consumption other than the hydrogen gas required for power generation.

Figure 6:
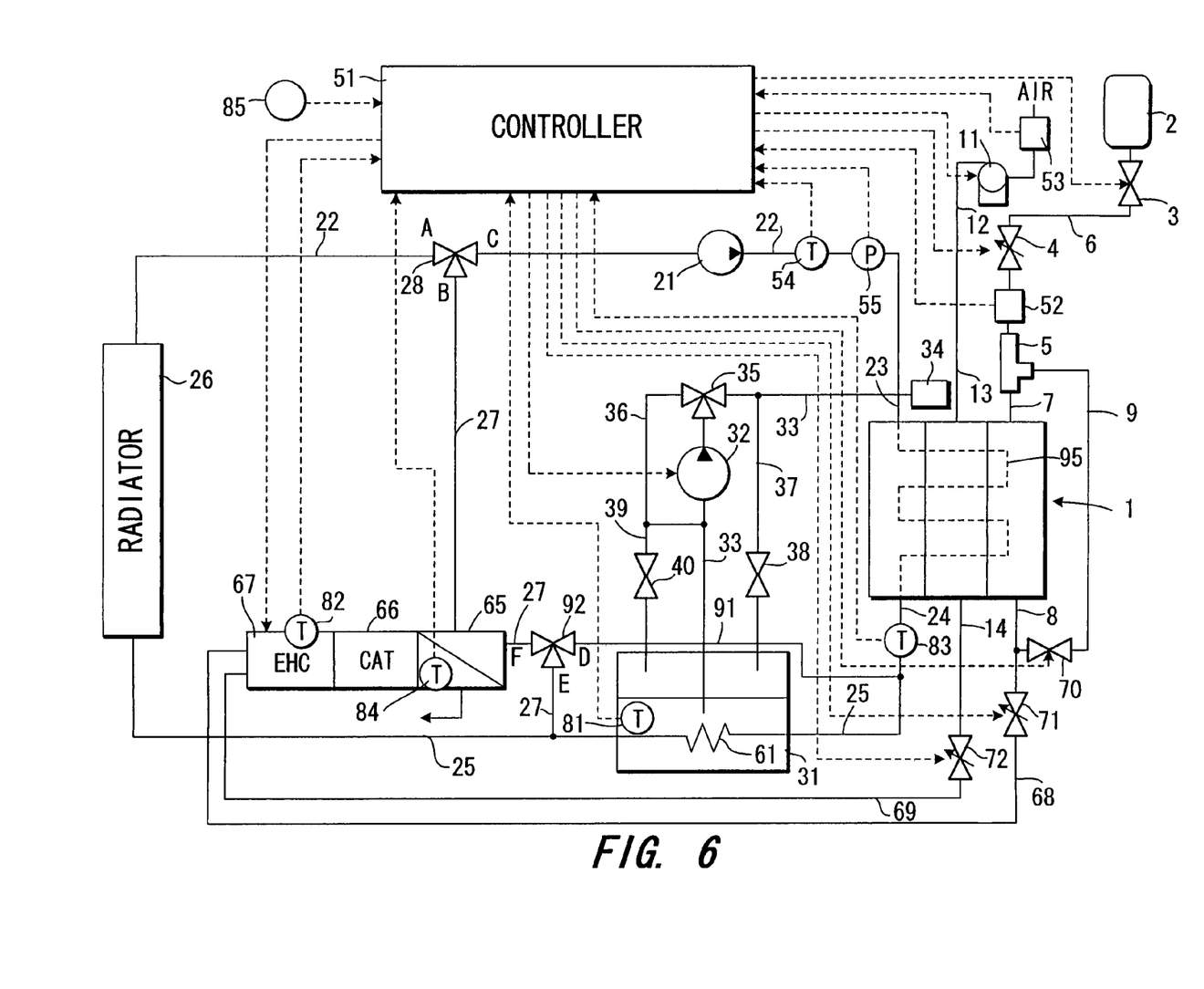
FIG. 6 is a schematic diagram of a fuel cell system according to a second embodiment.
Figure 7:
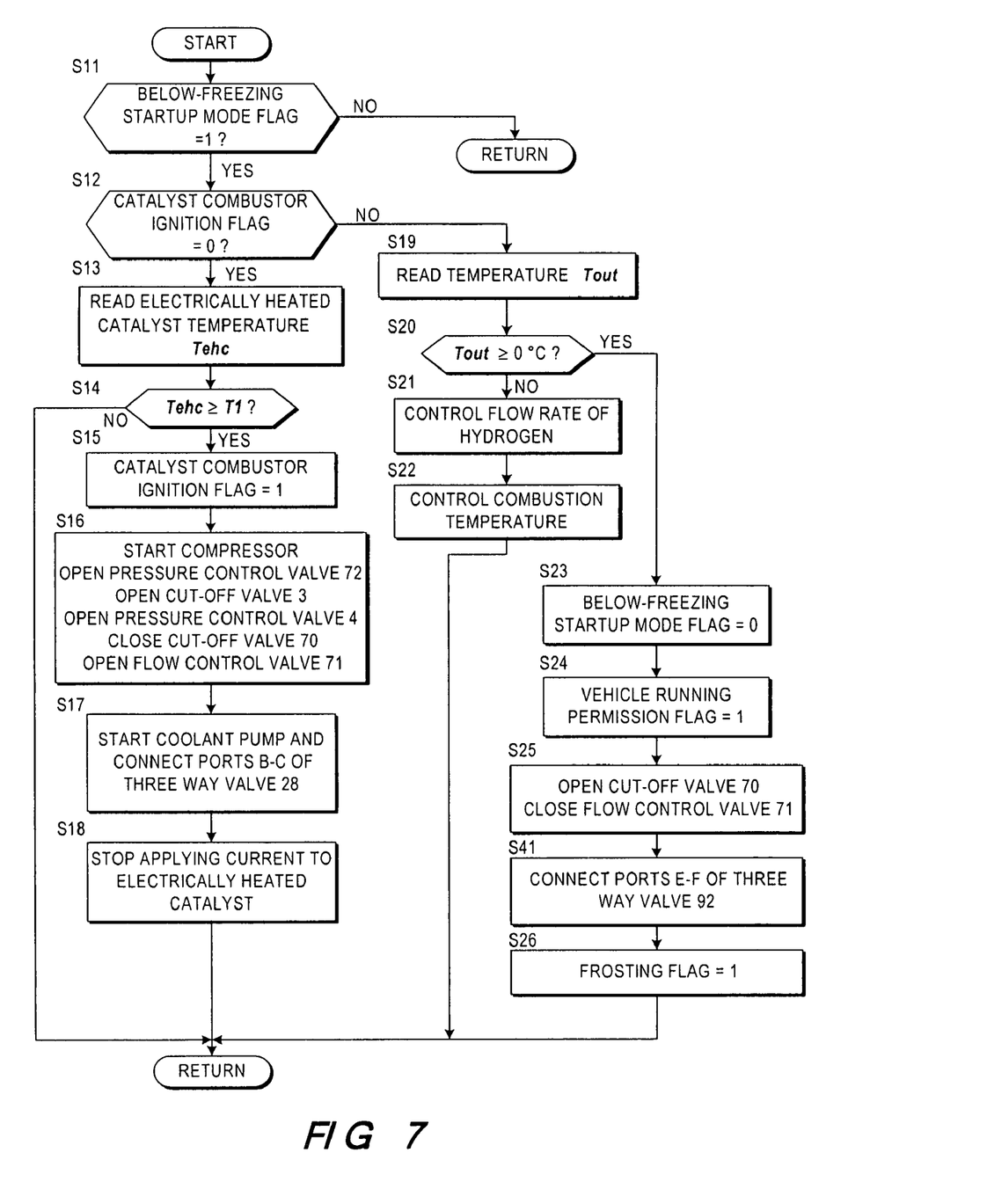
FIG. 7 is a flowchart showing a startup control routine according to the second embodiment.

Referring to FIG. 6 and FIG. 7, a second embodiment will be described. FIG. 6 shows a schematic figure of a fuel cell system according to a second embodiment. The flowchart shown in FIG. 7 shows a startup control routine below freezing point according to the second embodiment. FIG. 6 replaces FIG. 1 and FIG. 7 replaces FIG. 3. In FIG. 6, the same components are designed by the same reference numerals as those used in FIG. 1. In FIG. 7, the same step numbers are designed by the same reference numerals as those used in FIG. 3.

As shown in FIG. 6, the point of difference of the second embodiment from the first embodiment is that the fuel cell system is provided with a second bypass passage 91 which bypasses the water tank 31 and is connected from the coolant passage outlet 24 of the fuel cell 1 to the first bypass passage 27. The second bypass passage 91 is connected to the bypass passage 27 through the three-way valve 92. When no current is applied, the three-way valve 92 connects the port D with the port F and cuts off the port E from the port F. When current is applied, the port D is cut off from the port F and the port E is connected to the port F.

In FIG. 7, the point of difference from the first embodiment lies in the addition of the step S41. In the FIG. 7, when the temperature Tehc of the electrically heated catalyst 67 reaches a predetermined temperature T1 and enables ignition in the catalytic combustor 66, supply of air and hydrogen to the catalytic combustor 66 is performed in the step S16 and S17. In the first embodiment, the coolant flows through the heat exchanger 61 in the water tank 31. In contrast in the second embodiment, coolant bypasses the water tank 31 since a current is not applied to the three-way valve 92 in this stage.

Thereafter the coolant temperature Tout of the fuel cell outlet 24 takes a value of greater than or equal to 0° C. Thus high levels of power generation by the fuel cell 1 are possible and vehicle operation is permitted. In the step S25, hydrogen supply to the catalytic combustor 66 is stopped and the routine is proceeds to a step S41. In the step S41, the controller 51 applies a current to the three-way valve 92 so that coolant flows via the heat exchanger 61. In other words, the controller 51 commands the three-way valve 92 to cut off the connection of the port D and the port F and connect the port E with the port F.

Thus the point of difference from the first embodiment of the second embodiment is that while the coolant temperature Tout (which can be representative of the temperature of the fuel cell) in the fuel cell outlet 24 is less than 0° C., coolant flows through the second bypass passage 91 to the three-way valve 92 (passage switching passage) and does not flow via the heat exchanger 61. In this manner, heat energy produced in the heat exchanger 65 (the heater) in the water tank 31 is not used in the heat exchanger 61 in the water tank 31. In other words, the heat exchanger 65 does not generate heat energy for increasing the temperature of ice and latent heat of fusion required for melting ice in the water tank 31. In this manner, it is possible to shorten the startup time of the fuel cell 1.

When the coolant temperature Tout of the fuel cell outlet 24 takes a value which is greater or equal to a second predetermined temperature T2 and melting of all ice in the water tank 31 is finished, a current is not applied to the three-way valve 28, and thus coolant is recirculated through the radiator 26 and the heat exchanger 61.

The above two embodiments rest on the premise that the heat exchange characteristics with the coolant in the fuel cell are extremely efficient and that the temperature of the fuel cell is approximately equal to the coolant temperature Tout at the outlet of the fuel cell 1. However when heat exchange characteristics with the coolant in the fuel cell are poor and the coolant temperature Tout at the outlet of the fuel cell 1 diverges from the fuel cell temperature, the temperature sensor 83 performs direct detection of the temperature of the main body of the fuel cell 1 instead of detecting the temperature of the coolant at the fuel cell outlet. Thus the temperature at which power generation by the fuel cell 1 is enabled can be accurately detected.

Further, hydrogen supplied to the fuel cell 1 in the above two embodiments may comprise hydrogen (reformate gas) obtained as a result of reforming a hydrocarbon fuel.

The entire contents of Japanese Patent Application P2002-301448 (filed Oct. 16, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

The invention claimed is:

1. A fuel cell system having: a fuel cell generating power as a result of chemical reactions between supplied gases, wherein a coolant flows in the fuel cell and undergoes a temperature increase as a result of absorbing waste heat produced by power generation in the fuel cell; a water tank; a humidifying device for humidifying at least one supplied gas by using water from the water tank; and a coolant temperature regulation device for regulating a temperature of the coolant flowing inside the fuel cell so as to control the temperature of the fuel cell;

the fuel cell system comprising:
- a defrosting device for melting ice in the water tank by applying heat of the coolant to the water tank, wherein the defrosting device is disposed in the water tank and comprises a heat exchanger allowing heat exchange between the coolant from the fuel cell and the ice in the water tank;
- a heater for heating the coolant discharged from the defrosting device;
- a coolant recirculation passage for allowing a recirculation of the coolant through the defrosting device, the heater and the fuel cell;
- a flow generator for generating a flow of the coolant heated by the heater from the heater to the defrosting device via the fuel cell; and
- a controller for controlling a startup operation of the fuel cell system, the controller having the function of controlling the flow generator to generate a flow of coolant from the fuel cell to the defrosting device so as to melt ice in the water tank while the startup operation of the fuel cell system.

2. The fuel cell system as defined by claim 1, further comprising a temperature sensor for detecting a temperature of the coolant;

wherein the coolant temperature regulation device comprises:
- a radiator provided on the coolant recirculation passage;
- a first bypass passage branching from the coolant recirculation passage and bypassing the radiator, the heater being disposed in the first bypass passage; and
- a passage switching device for selectively switching the passage for the coolant between a passage passing through the radiator and a passage passing through the first bypass passage;

and wherein the controller further functions to control the passage switching device in response to a detected temperature of the coolant so as to regulate the temperature of the coolant.

3. The fuel cell system as defined by claim 2, wherein the water tank is disposed in the coolant recirculation passage upstream of the position at which the first bypass passage branches from the recirculation passage.

4. The fuel cell system as defined by claim 2, wherein the controller functions to control the passage switching device to allow the passage for the coolant passing through the radiator when the detected temperature of the coolant is greater than or equal to a second predetermined temperature.

5. The fuel cell system as defined by claim 2, further comprising a temperature sensor for detecting a water temperature in the water tank;

wherein the controller is operable to start the heater when the detected water temperature in the water tank is less than or equal to freezing point of water.

6. The fuel cell system as defined by claim 5, wherein the heater is a heat exchanger integrated with a catalytic combustor and an electrically heated catalyst for increasing the temperature of gases supplied to the catalytic combustor, the heat generated by the catalytic combustor being applied to the coolant by the heat exchanger, wherein the controller functions to start the heater by applying current to the electrically heated catalyst when the detected water temperature in the water tank is less than or equal to freezing point of water.

7. The fuel cell system as defined by claim 6, further comprising a temperature sensor for detecting a temperature in the electrically heated catalyst;

wherein the controller functions to start the flow generator and to allow a passage of the coolant through the first bypass passage, when the detected temperature in the electrically heated catalyst is greater than or equal to a first predetermined temperature.

8. The fuel cell system as defined by claim 1, further comprising a temperature sensor for detecting a temperature of the fuel cell;

wherein the controller further functions to compare the detected temperature of the fuel cell with freezing point of water; operate the heater when the detected temperature of the fuel cell is less than freezing point; and stop the operation of the heater when the detected temperature of the fuel cell is greater than or equal to freezing point.

9. The fuel cell system as defined by claim 1, further comprising:
- a second bypass passage branching upstream of the water tank and bypassing the water tank; and
- a passage switching device for switching the passage for the coolant between a passage passing through the heat exchanger in the water tank and a passage passing through a second bypass passage.

10. The fuel cell system as defined by claim 9, further comprising a temperature sensor for detecting a temperature of the fuel cell, wherein the controller further functions to compare the detected temperature of the fuel cell with freezing point of water; control the passage switching device so that the coolant flows through the second bypass passage when the detected temperature of the fuel cell is less than freezing point; and control the passage switching device so that the coolant flows through the heat exchanger in the water tank when the detected temperature of the fuel cell is greater than or equal to freezing point.

11. A vehicle comprising the fuel cell system as defined by claim 1.

12. A fuel cell system having: a fuel cell generating power as a result of chemical reactions between supplied gases, wherein a coolant flows in the fuel cell and undergoes a temperature increase as a result of absorbing waste heat produced by power generation in the fuel cell; a water tank; a humidifying device for humidifying at least one supplied gas by using water from the water tank; and a coolant temperature regulation device for regulating a temperature of the coolant flowing inside the fuel cell so as to control the temperature of the fuel cell;

the fuel cell system comprising:
- a defrosting means for melting ice in the water tank by applying heat of the coolant to the water tank, wherein the defrosting means is disposed in the water tank and comprises a heat exchanger means allowing heat exchange between the coolant from the fuel cell and the ice in the water tank;
- a heater means for heating the coolant discharged from the defrosting means;
- a coolant recirculation passage means for allowing a recirculation of the coolant through the defrosting means, the heater means and the fuel cell;
- a flow generating means for generating a flow of the coolant heated by the heater mans from the heater means to the defrosting means via the fuel cell; and
- a control means for controlling the flow generator to generate a flow of coolant from the fuel cell to the defrosting means so as to melt ice in the water tank while a startup operation of the fuel cell system.

13. A control method for controlling a fuel cell system, the fuel cell system having: a fuel cell generating power as a result of chemical reactions between supplied gases, wherein a coolant flows in the fuel cell and undergoes a temperature increase as a result of absorbing waste heat produced by power generation in the fuel cell; a water tank; a humidifying device for humidifying at least one supplied gas by using water from the water tank; and a coolant temperature regulation device for regulating a temperature of the coolant flowing inside the fuel cell so as to control the temperature of the fuel cell;

the control method comprising the steps of:

providing a defrosting device for melting ice in the water tank by applying heat of the coolant to the water tank, wherein the defrosting device is disposed in the water tank and comprises a heat exchanger allowing heat exchange between the coolant from the fuel cell and ice in the water tank;

providing a heater for heating the coolant discharged from the defrosting device;

providing a coolant recirculation passage for allowing a recirculation of the coolant through the defrosting device, the heater and the fuel cell; and generating a flow of coolant heated by the heater from the heater to the defrosting device via the fuel cell so as to melt ice in the water tank while a startup operation of the fuel cell system.

* * * * *